June 30, 1953   J. LACH   2,643,878
FOLDING MACHINE FOR CONTINUOUS STRIPS OF STATIONERY
Filed Aug. 14, 1950   7 Sheets-Sheet 1

Inventor:
John Lach
By Schrader, Merriam,
Hofgren & Brady
Attorneys

June 30, 1953 J. LACH 2,643,878
FOLDING MACHINE FOR CONTINUOUS STRIPS OF STATIONERY
Filed Aug. 14, 1950 7 Sheets-Sheet 2

Inventor:
John Lach
By Schroeder, Merriam,
Hofgren & Brady
Attorneys

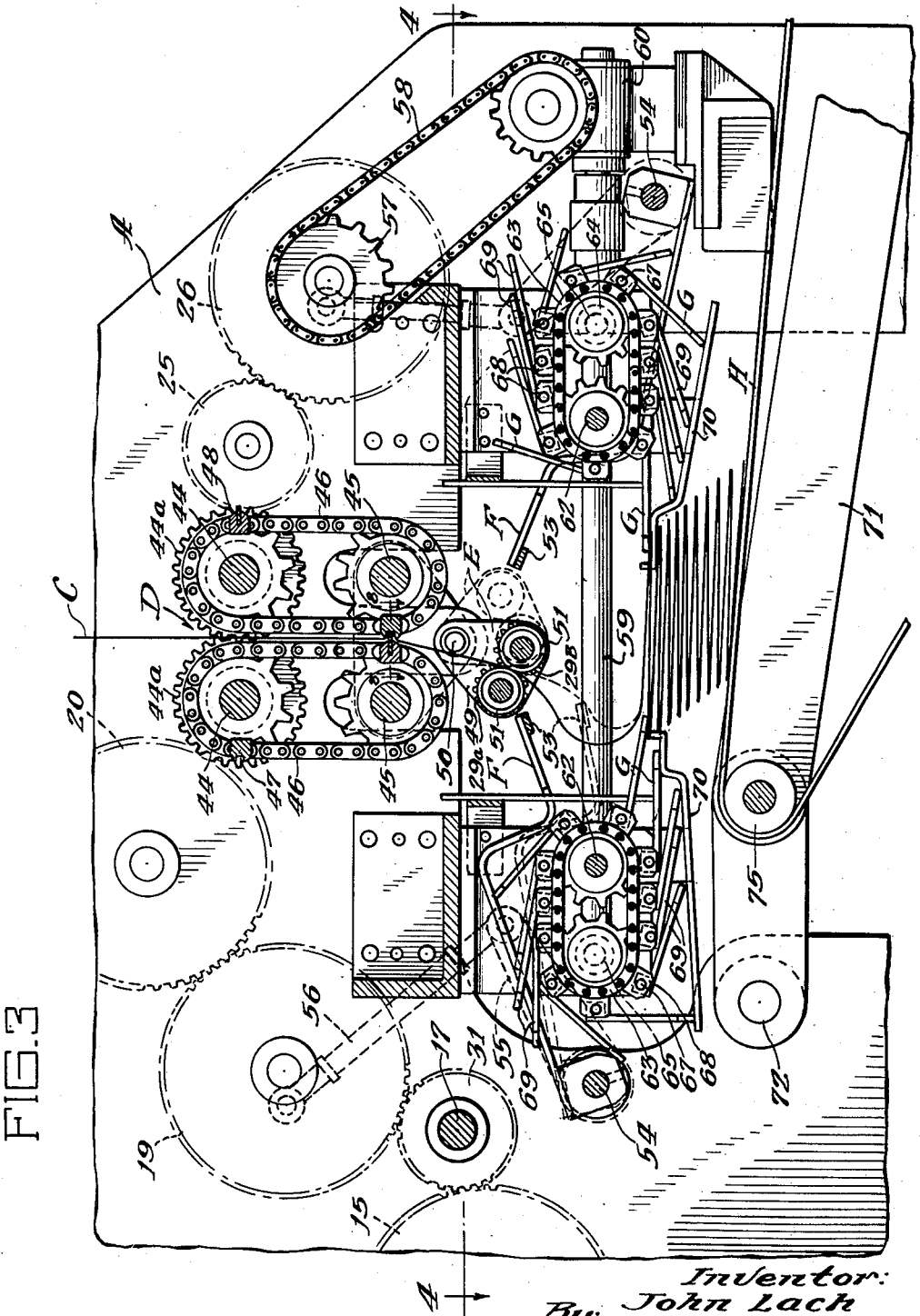

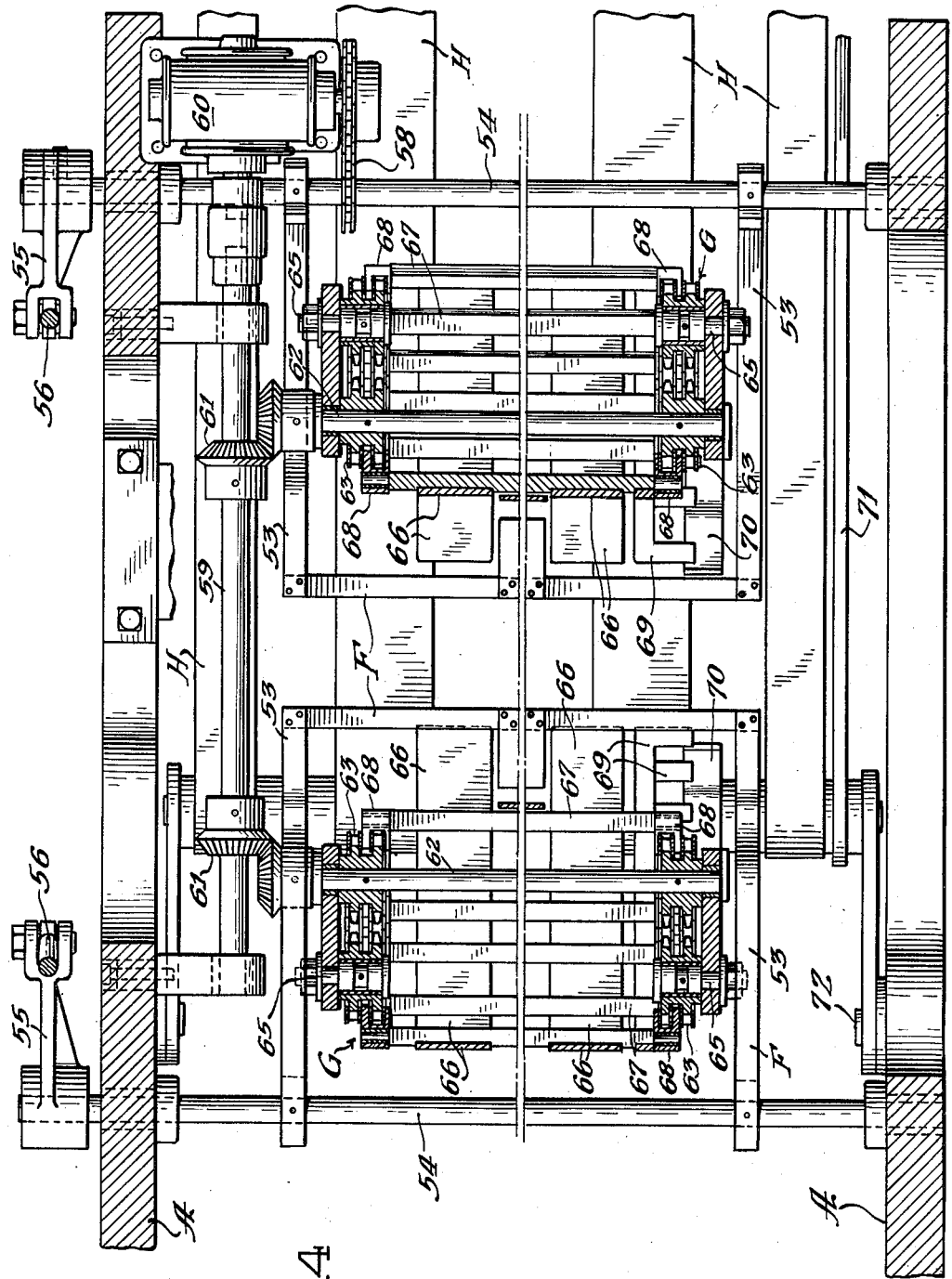

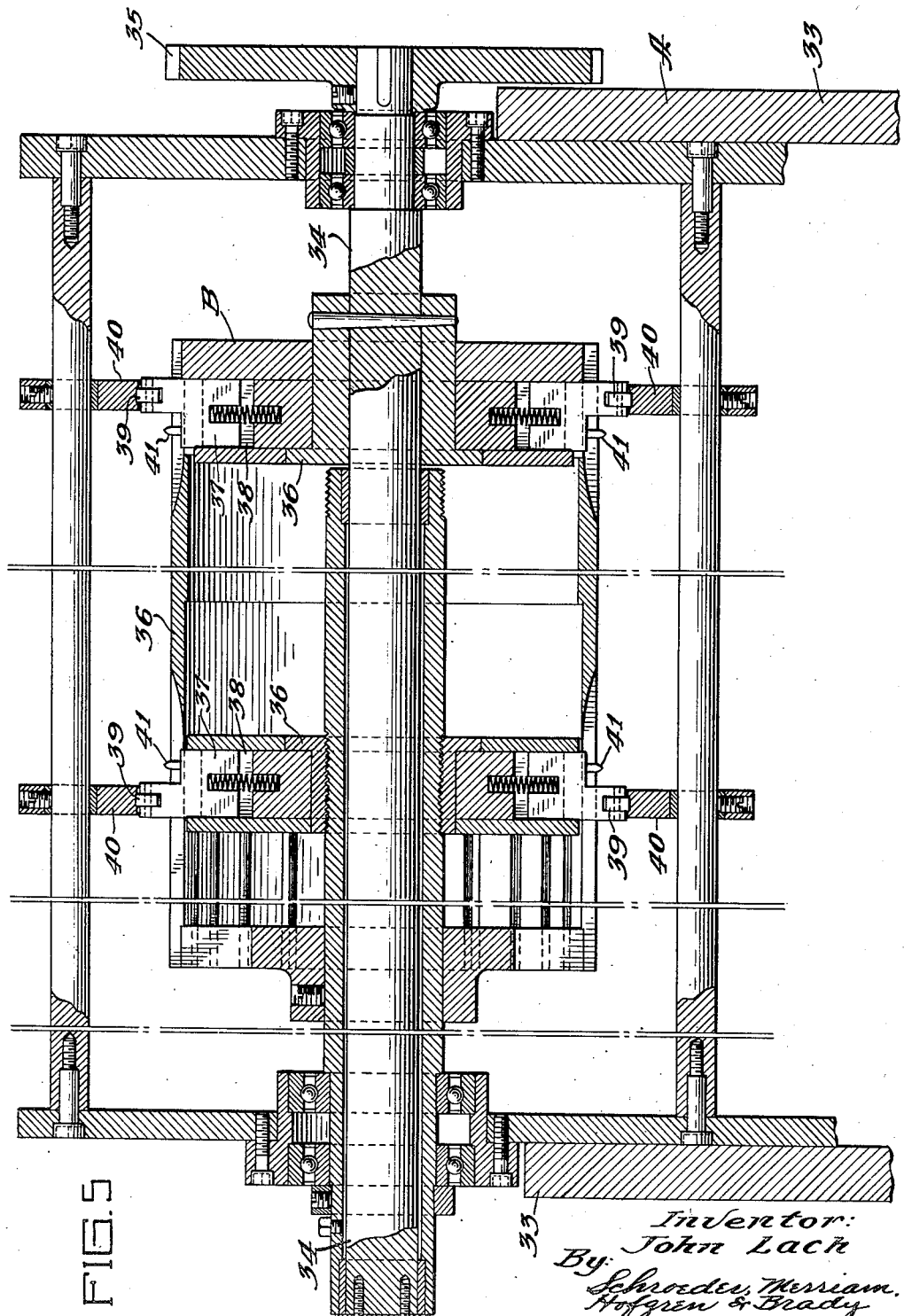

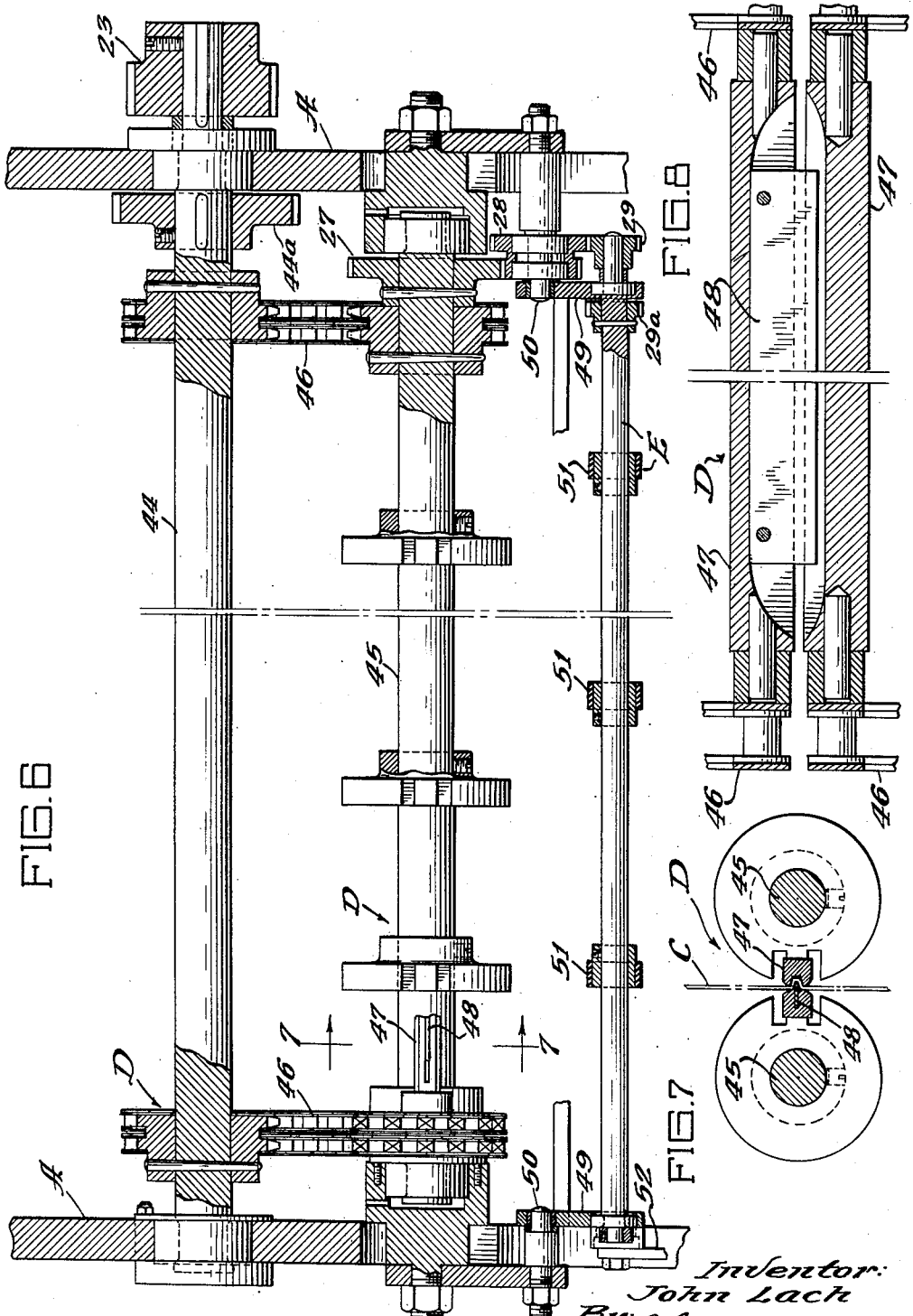

June 30, 1953  J. LACH  2,643,878
FOLDING MACHINE FOR CONTINUOUS STRIPS OF STATIONERY
Filed Aug. 14, 1950  7 Sheets-Sheet 7
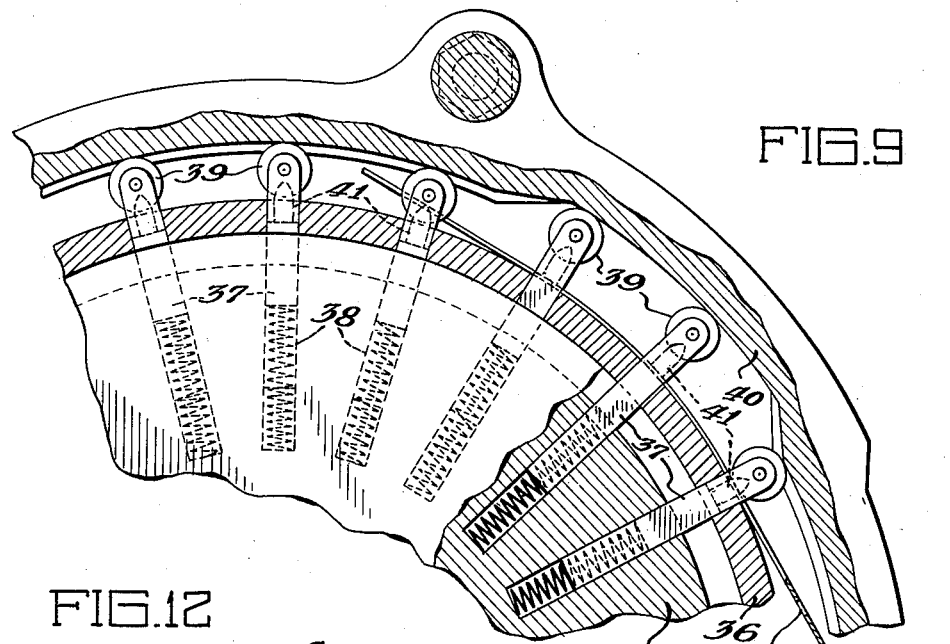
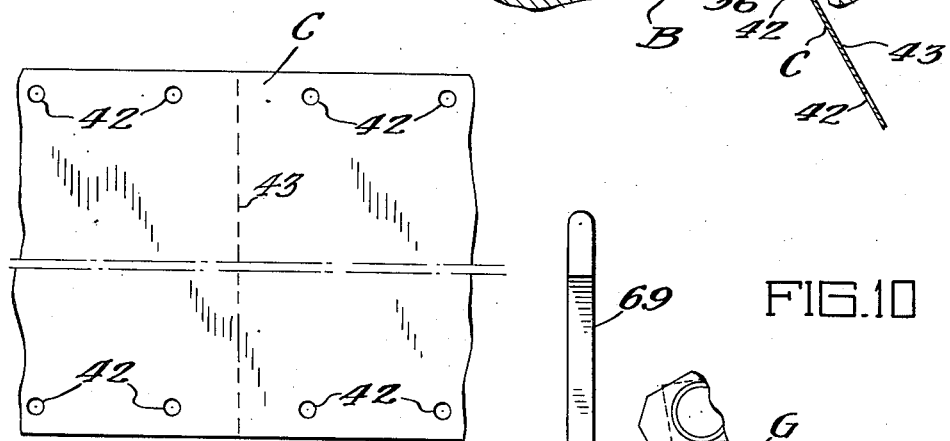
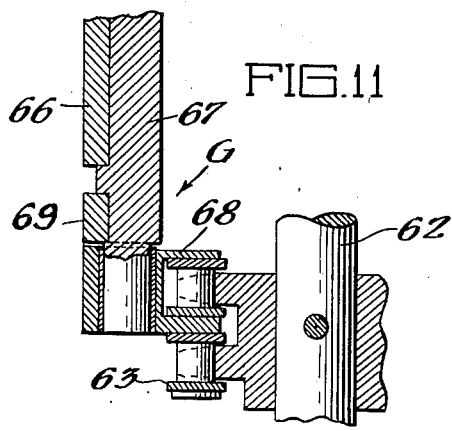
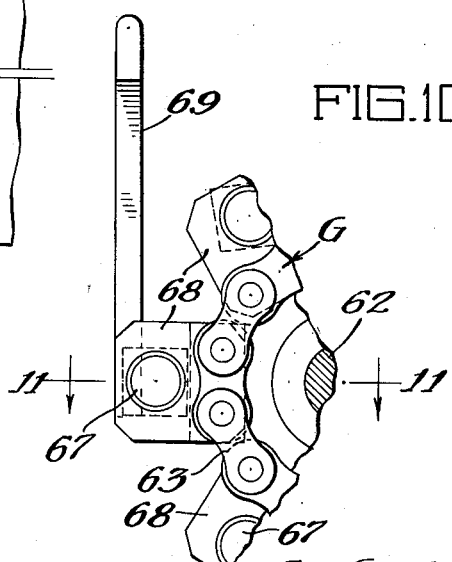

Patented June 30, 1953

2,643,878

UNITED STATES PATENT OFFICE 2,643,878

FOLDING MACHINE FOR CONTINUOUS STRIPS OF STATIONERY

John Lach, Chicago, Ill., assignor to Uarco Incorporated, a corporation of Illinois Application August 14, 1950, Serial No. 179,152

6 Claims. (Cl. 270—39)

This invention relates to folding devices for long strips of stationery which may have printed forms divided by lines of weakening.

The primary object of the invention is to provide a machine which will automatically bring strips of continuous form stationery and interleaved carbon into accurate alignment and then crease the strips at the line of weakening and fold them into a zig-zag folded stack. These operations have commonly been performed by hand, but the present invention provides a machine which is more accurate and may be operated much more rapidly than the operations have heretofore been performed.

A further object of the invention is to provide improved creasing devices which progressively increase the amount of crease without tearing the strip.

Another object of the invention is to provide an improved distributing device for directing the stationery into zig-zag folded position.

Another object of the invention is to provide pressure arms for forming a stack of stationery and holding arms for maintaining the folds after the pressure arms have been moved to admit another fold.

A further object of the invention is to provide an improved drive mechanism for actuating the various movable parts in timed relation.

The invention is illustrated in a preferred embodiment in the accompanying drawings in which—

Figure 1:
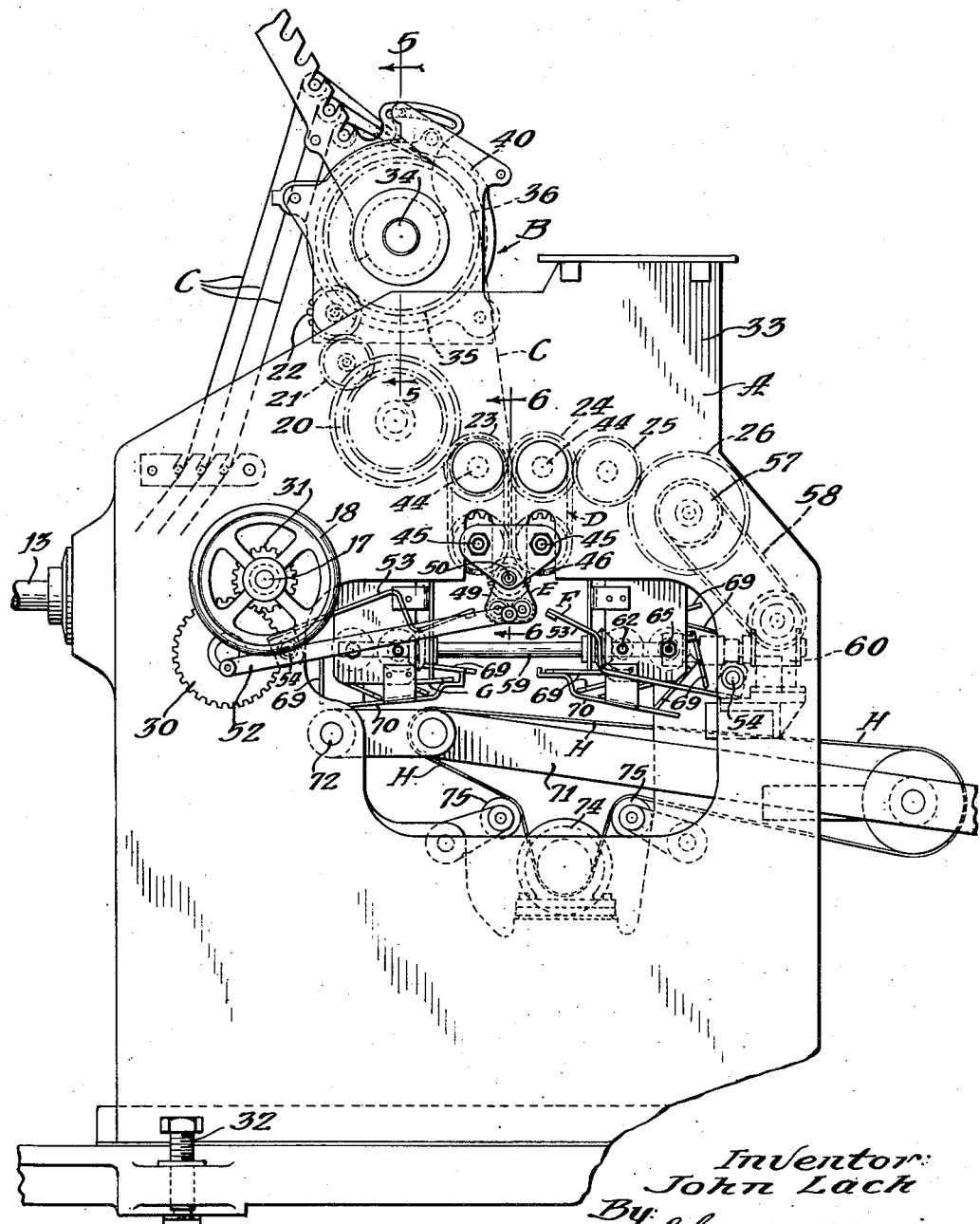
Figure 2:
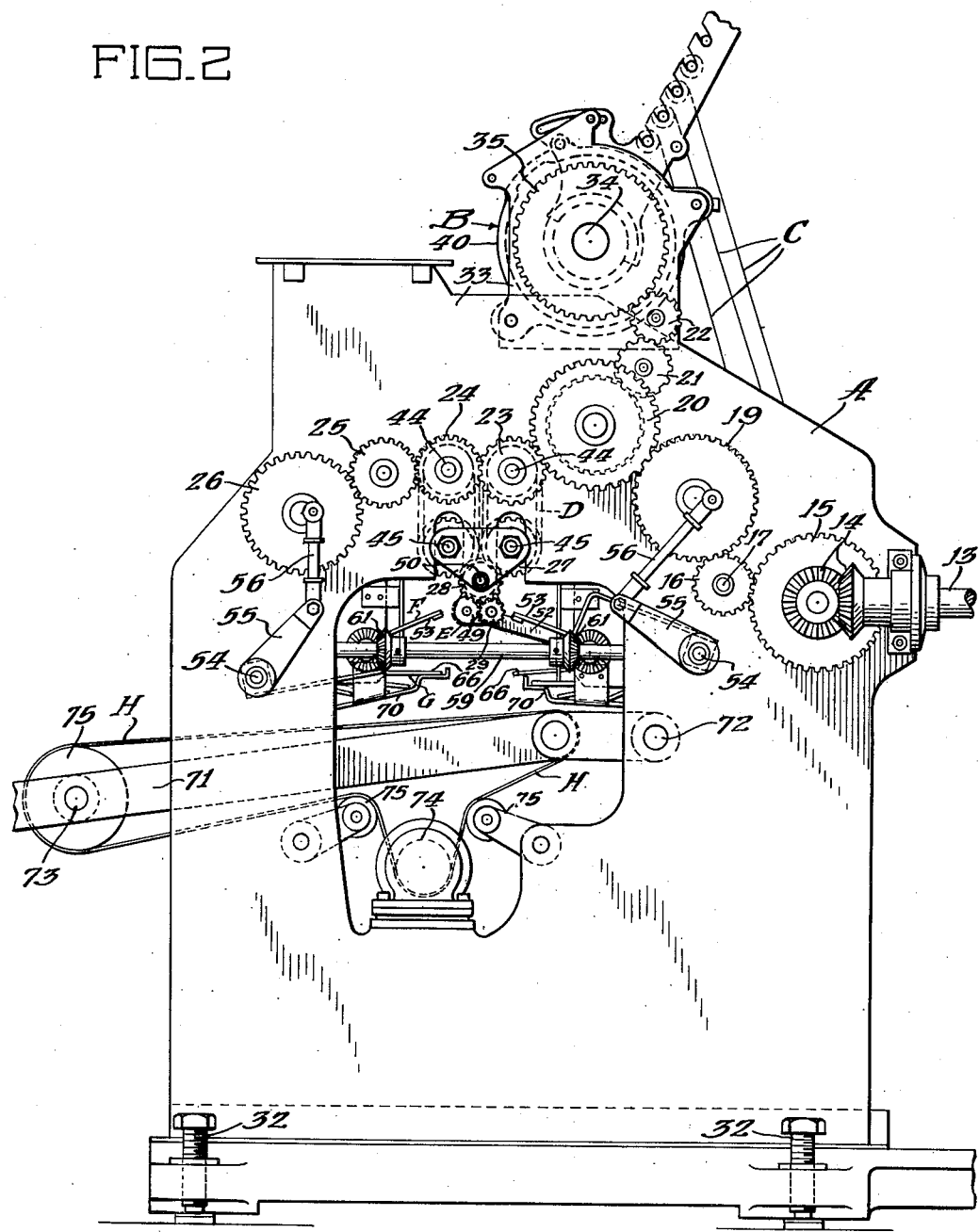

Figure 1 is a fragmentary side elevational view of a folding machine embodying the invention; Fig. 2, a similar view from the opposite side of the machine; Fig. 3, a fragmentary vertical sectional view similar to Fig. 1, with a side frame of the machine removed; Fig. 4, a fragmentary plan sectional view, taken as indicated at line 4—4 of Fig. 3; Fig. 5, a fragmentary vertical sectional view of the feed wheel with retractable pins, taken as indicated at line 5—5 of Fig. 1; Fig. 6, a fragmentary vertical sectional view, taken as indicated at line 6—6 of Fig. 1; Fig. 7, a fragmentary vertical sectional view showing how the stationery is creased between a pair of tongue and groove members on the creasing devices; Fig. 8, a fragmentary sectional view, taken as indicated at line 8—8 of Fig. 3; Fig. 9, an enlarged fragmentary sectional view of the pin retracting mechanism and main feed wheel; Fig. 10, an enlarged fragmentary sectional view, showing how a holding arm is mounted on a chain; Fig. 11, a fragmentary sectional view, taken as indicated at line 11—11 of Fig. 10; and Fig. 12, a fragmentary plan view of a strip of stationery of the type handled by the machine.

In the embodiment illustrated, a main frame A is provided at its top portion with a feed wheel B, having retractable pins to feed strips of stationery C downwardly into creasing devices D from which they are fed by a distributing device E beneath pressure arms F which form a zig-zag folded stack which is held by holding arms G on a discharge belt conveyor H.

As best shown in Fig. 2, the folding mechanism is driven from a shaft 13 having a bevel gear 14 which drives a bevel gear on a spur gear 15, meshing with a gear 16 on a shaft 17 which is provided at its opposite end with a hand wheel 18. The gear 16 drives a crank gear 19 which meshes with a compound gear 20 whose smaller gear drives a gear for the feed wheel B by means of idler gears 21 and 22.

The larger gear of the compound gear 20 drives the gear 23 of the creasing devices D. The gear 23, through idler gears 24 and 25, drives a crank gear 26 for one of the pressure arms.

As shown in Fig. 2, the lower portion of one of the creasing devices D is provided with a gear 27 which meshes with a gear 28 and drives a gear 29 provided on one of the feed rolls of the distributing device E. The distributing device is oscillated by a connection with a crank gear 30, which meshes with a gear 31 on the shaft 17.

The main frame A is provided with leveling feet 32 and has side plates 33 to support the various elements.

The feed wheel B is journalled at the top of the frame and has a shaft 34 with a gear 35 driven by gear 22. As best shown in Figs. 5 and 9, the shaft 34 is adjustable longitudinally to accommodate various widths of stationery, and is provided with a pair of spaced wheels 36 which have radial slots to receive pin members 37 which are urged outwardly by springs 38. Each of the pin members has a roller 39, which bears against one of the laterally adjustable cams 40, and only permits its pin 41 to be extended during a short segment of its revolution. As shown in Fig. 12, the stationery strips and carbon strips are provided with marginal perforations 42 which are engaged and aligned by the pins 41 when in extended position. The strips have lines of weakening 43 on which the folds are to be made.

As the strips leave the feed wheels B they pass downwardly between the creasing devices D. The creasing devices have upper shafts 44 driven by gear 23, at the same speed because of intermeshing gears 44a, and the lower shafts 45 are provided with sprocket wheels for endless chains 46. Each pair of chains, on each side, carries one groove member 47 and one tongue member 48, which cooperate with the members on the opposed chains to form a crease along the line of weakening 43 in the strip C.

Preferably the upper shafts 44 are spaced apart about a quarter of an inch farther than the lower shafts 45, so that the crease is gradually formed as the strip moves downwardly to the distributing device E.

The distributing device E is in the form of an auxiliary frame 49 which is pivotally mounted on the main frame at 50. One of the feed rolls 51 is power driven by the gear 29a which is the same size and is on the same shaft as gear 29. Gear 29a drives a gear 29b on the companion feed roll. The rolls turn slightly faster than the travel of the stationary strips, so as to exert a slight tension on the strips. The frame 49 is rocked back and forth by a link 52 connected to the crank gear 30. This causes the strip to be fed from one side to the other of the top of a stack.

Pressure arms 53 are mounted on shafts 54, which have crank arms 55 connected by links 56 to the crank gears 19 and 26, so as to oscillate in alternate timed relation. Thus, as shown in Fig. 3, each pressure arm is raised as the distributor E feeds the strip under it, and it is then lowered to form a fold as the distributor directs the strip under the opposite pressure arm which is being raised.

In order to hold the freshly formed fold at the top of the stack while the pressure arms are being raised, the holding arm mechanism G is provided. The devices are similar and work on opposite sides of the stack. The gear 26 has a sprocket wheel 57 which through a chain 58 drives a shaft 59 through a speed reducer 60. The shaft 59 has bevel gears 61 which drive the inner shafts 62. The shafts 62 have sprocket wheels for chains 63 which travel around rear sprocket wheels 64 on shafts 65. The holding arms 66 are mounted on cross shafts 67 journalled in brackets 68 which are secured to the chains 63. As best shown in Figs. 3 and 4, each of the shafts 67 is provided with an arm 69 which engages and travels along the guide plate 70 so as to limit the downward travel of the arm 66 and facilitate its withdrawal from between the folds. As the holding arms are moved into stacking-engaging position alternately, it will be understood that they will hold the stack in limited compressed condition.

The belt conveyor H receives the stack, as shown in Fig. 3, and gradually feeds it out of the machine in biased condition. A frame member 71 is supported at its front end at 72 and at its rear end at 73. A speed reducing drive member 74 drives the belt about a series of guide rollers 75.

Operation

In operation, marginally punched record strips with interleaved carbon are drawn upwardly by the feed wheel with retractable pins and are fed downwardly between the creasing devices which form creases in alternate lines of weakening in opposite directions. The distributing device draws the creased strip downwardly and directs it alternately under the pressure arms which form the folds, and is held in stacked position by the successive action of the holding arms. The completed zig-zag folded stationery is fed out of the machine on a belt conveyor.

The foregoing detailed description is given for clearness of understanding only, and no unnecessary limitations should be understood therefrom, for some modifications will be obvious to those skilled in the art.

I claim:

1. A folding machine for continuous strips of stationery, comprising: a frame provided with a feed wheel with pins to engage marginal perforations in the strips and align the strips; a pair of opposed creasing devices mounted on the frame and having a plurality of complementary tongue and groove members to form creases alternately in opposite directions in the advancing strips of stationery; a driven distributing device for drawing the creased strips from the creasing devices; a pair of pressure arms for alternately engaging the strips adjacent to each advancing crease and compressing said strips into a zig-zag folded stack; a plurality of hingedly supported holding arms mounted adjacent the stack so as to fall by gravity to engage and press the top of the stack successively; and drive mechanism for operating said creasing devices, pressure arms and holding arms in timed relation.

2. A device as specified in claim 1, wherein the distributing device includes a pair of driven feed rolls mounted on a movable auxiliary frame and disposed between the creasing devices and the pressure arms, means for moving said frame to direct the advancing strips alternately under one or the other of the pressure arms, and driving connections with the drive mechanism so as to operate said feed rolls and frame means in timed relation to the movement of said pressure arms, the drive to said feed rolls being adapted to apply tension to the strips.

3. A device as specified in claim 1, in which the stationery strips are directed downwardly to stacking position, the holding arms are hinged to a pair of endless belts which move so that the free ends of the arms will drop by gravity on opposite edges of the top of the stack.

4. A device as specified in claim 1, in which the stationery strips are directed downwardly to stacking position, the holding arms are hinged to a pair of endless belts which move so that the free ends of the arms will drop by gravity on opposite edges of the top of the stack, and the pressure arms overreach said holding arms and are oscillated upwardly.

5. A device as specified in claim 1, in which the tongue and groove members of the creasing devices are mounted on endless belts whose upper portions are spaced apart about one fourth of an inch more than their lower portions so that each crease in the strips will be formed progressively as the strips travel downwardly between a pair of tongue and groove members.

6. A device as specified in claim 1, in which the feed wheel has a plurality of carriers each mounting a pin and a roller, said carriers being urged outwardly in contact with a cam member peripherally spaced around the wheel, said feed wheel being driven in time relation to the creasing devices so as to control the advance of the strips to said devices.

JOHN LACH.

References Cited in the file of this patent

UNITED STATES PATENTS

| Number | Name | Date |
|---|---|---|
| 946,393 | Nichols | Jan. 11, 1910 |
| 1,015,580 | Nichols | Jan. 23, 1912 |
| 1,109,296 | Lewis | Sept. 1, 1914 |
| 1,228,835 | Schuchart | June 5, 1917 |
| 1,348,846 | Brown et al. | Aug. 10, 1920 |
| 1,484,069 | Hudson | Feb. 19, 1924 |
| 1,699,165 | Sherman et al. | Jan. 15, 1929 |
| 2,246,336 | Wyrick | June 17, 1941 |
| 2,268,891 | Mueller | Jan. 6, 1942 |
| 2,401,597 | Winter | June 4, 1946 |
| 2,495,994 | Ward et al. | Jan. 31, 1950 |